US012733636B2

(12) United States Patent
Lott et al.

(10) Patent No.: US 12,733,636 B2
(45) **Date of Patent: *Sep. 15, 2026**

(54) DURABLE ANTI-FUNGAL AND ALGAE RESISTANT COATINGS

(71) Applicant: MICROBAN PRODUCTS COMPANY, Huntersville, NC (US)

(72) Inventors: Craig Lott, Denver, NC (US); Jesse Turmenne, Mount Holly, NC (US); James Rapley, Huntersville, NC (US)

(73) Assignee: MICROBAN PRODUCTS COMPANY, Huntersville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/569,027

(22) Filed: Mar. 17, 2026

(65) Prior Publication Data

US 2026/0206750 A1 Jul. 23, 2026

Related U.S. Application Data

(63) Continuation of application No. 19/419,851, filed on Dec. 15, 2025, now Pat. No. 12,599,132, which is a continuation of application No. 19/300,134, filed on Aug. 14, 2025, now Pat. No. 12,520,841.

(60) Provisional application No. 63/806,296, filed on May 15, 2025, provisional application No. 63/684,030, filed on Aug. 16, 2024.

(30) Foreign Application Priority Data

Aug. 22, 2024 (NL) ..................................... 2038484
Jun. 4, 2025 (NL) ..................................... 2040503

(51) Int. Cl.

| | |
|---|---|
| ***A01N 37/22*** | (2006.01) |
| ***A01N 25/08*** | (2006.01) |
| ***A01N 31/02*** | (2006.01) |
| ***A01N 43/40*** | (2006.01) |
| ***A01N 43/52*** | (2006.01) |
| ***A01N 43/66*** | (2006.01) |
| ***A01N 59/00*** | (2006.01) |
| ***A01P 3/00*** | (2006.01) |
| ***A01P 13/00*** | (2006.01) |

(52) U.S. Cl.

CPC ............. *A01N 37/22* (2013.01); *A01N 25/08* (2013.01); *A01N 31/02* (2013.01); *A01N 43/40* (2013.01); *A01N 43/52* (2013.01); *A01N 43/66* (2013.01); *A01N 59/00* (2013.01); *A01P 3/00* (2021.08); *A01P 13/00* (2021.08)

(58) Field of Classification Search

CPC ........ A01N 37/22; A01N 25/08; A01N 31/02; A01N 43/40; A01N 43/52; A01N 43/66; A01N 59/00; A01P 3/00; A01P 13/00

See application file for complete search history.

(56) References Cited

U.S. PATENT DOCUMENTS

| | | | |
|---|---|---|---|
| 5,585,407 | A | 12/1996 | Patel et al. |
| 5,990,188 | A | 11/1999 | Patel et al. |
| 2012/0164203 | A1 | 6/2012 | Premachandran |
| 2013/0296461 | A1 | 11/2013 | Sadasivan |
| 2024/0130359 | A1 | 4/2024 | Herchen et al. |

FOREIGN PATENT DOCUMENTS

| | | | |
|---|---|---|---|
| CN | 116209724 | A | 6/2023 |
| EP | 0982356 | A2 | 3/2000 |
| JP | H11293153 | A | 10/1999 |

OTHER PUBLICATIONS

Non-Final Office Action (NFOA) from U.S. Appl. No. 19/300,145; dated Apr. 9, 2026; 43 pages.

Santos, "Biocides encapsulation." Soft Matter, p. 5340 (2022).

Wang, "Biocide-encapsulated core-shell polymer microspheres." p. 1 (2024).

Trzaskowska, "silicone-acrylic hybrid." Prop. Org. Coatings, p. 568 (2014).

Written Opinion (WO) for Dutch Application No. NL2038484; Mar. 18, 2025; 5 pages.

Notice of Allowance from U.S. Appl. No. 19/300,134; Nov. 24, 2025; 9 pages.

Extended European Search Report and Written Opinion from European Patent App. No. 25196335.1; Nov. 20, 2025; 7 pages.

Notice of Allowance from U.S. Appl. No. 19/419,851; Feb. 18, 2026; 10 pages.

*Primary Examiner* — Jeffrey T. Palenik

(74) *Attorney, Agent, or Firm* — Jason A. Smith; Shumaker, Loop & Kendrick, LLP

(57) ABSTRACT

A liquid anti-fungal and/or algae resistant composition that forms a clear coating on a substrate post-application in which the composition includes less than 0.01 wt % heavy metal containing components and less than 0.01 wt % fluoro containing components.

29 Claims, 3 Drawing Sheets

DURABLE ANTI-FUNGAL AND ALGAE RESISTANT COATINGS

TECHNICAL FIELD

The present invention relates generally to the field of durable anti-fungal and algae resistant coatings, and more particularly, compositions that form anti-fungal and algae resistant coatings, and methods of use thereof. In certain aspects, the anti-fungal and algae resistant coatings and the compositions that form anti-fungal and algae resistant coatings are durable and exclude heavy metals and/or fluoro containing components.

BACKGROUND

The utilization of prevention methods against algae and fungal growth on exterior substrates is essential for roofing, siding, and various other residential and commercial materials. These prevention methods include the use of exterior coatings that do not degrade during outdoor exposure. Current anti-fungal and algae resistant technologies use heavy metals to provide long term protection due to their water insolubility. Over recent years, concerns about the impact of these heavy metal complexes, toxicity associated therewith, when for example, leaching into municipal water systems has become a major concern.

Moreover, when applying the above-mentioned heavy metal complexes within coating formulations to, for example exterior substrates, fluorinated resins have been used as carriers and film forming compositions due to their durability and gloss retention properties. However, similar to the heavy-metal complexes mentioned above, fluorinated resins and fluoro containing compositions have fallen out of favor due to toxicity concerns occurring within plants and animals when contacted with such fluorinated resins and fluoro containing compositions.

JPH11293153 discloses triazines that are used as herbicides. The herbicides disclosed are water-soluble allowing the triazines to quickly leach out into the environment thereby negatively impacting the environment while concurrently quickly losing herbicidal efficacy. The compositions within JPH11293153 do not form durable coatings and/or are not contemplated for surface treatments of exterior substrates/building materials (e.g., roof shingles). US2013296461 discloses biosurfactants used as antimicrobials. The biosurfactants disclosed are water-soluble and will leach out into the environment within days. The composition rapidly loses efficacy creating a short-lived coating. Thus, neither JPH11293153 nor US2013296461 disclose a durable biocide and/or coating that can withstand an exterior environment such as roof shingles. Moreover, while US 2024/0130359 discloses antimicrobial coating/coating compositions, US 2024/0130359 does not contemplate the combinations of biocide(s), UV stabilizing agent, and/or hydroxyphenyltriazine disclosed herein. Likewise, CN 116 209 724 suffers from similar deficiencies. CN 116 209 724 discloses biocides as optional additives and only discloses the biocide, Acticide LA 0614, which is not a carbamate. Moreover, CN 116 209 724 does not contemplate the combinations of biocide(s), UV stabilizing agent, and/or hydroxyphenyltriazine disclosed herein.

SUMMARY

Accordingly, there is a need to provide a long lasting, water-based algae and fungal resistant coating that avoids the use of heavy metals and fluorinated resins. The disclosed compositions and coating eliminates the need for heavy metals by utilizing a highly stable binder system (film forming composition and clear film) to entrap the non-heavy metal actives without the use of fluorinated resins. The coatings disclosed herein exhibit weather resistance exceeding that of conventional acrylic and polyurethane systems and advantageously matches or exceeds the performance of fluorinated resins (e.g., durability and/or gloss retention). The biocidal actives are a unique combination of encapsulated biocides and non-encapsulated biocides that maximize anti-fungal and algae resistant properties of the coatings with minimal leaching from the coating. The water insoluble biocidal actives produce a durable, weather-resistant coating with minimal leaching over prolonged time periods.

In certain aspects, disclosed is a liquid anti-fungal and/or algae resistant composition that forms a coating on a substrate post-application comprising: (a) water at a concentration of up to 70 wt % of the composition; (b) a biocide dispersed within the water present in an effective amount to prevent and/or reduce fungal and/or algal growth on the substrate post-application; (c) a stabilizing agent dispersed within the water; and (d) a film forming composition dispersed within the water present in an effective amount to form a clear film on the substrate post-application.

In certain aspects, the composition includes less than 0.01 wt % heavy metal containing components and less than 0.01 wt % fluoro containing components.

In certain aspects, the film forming composition is an organic, inorganic hybrid resin/emulsion.

In certain aspects, the film forming composition comprises a siloxane component and organic component.

In certain aspects, the film forming composition comprises one or more co-polymers.

In certain aspects, the film forming composition comprises a siloxane component and at least one of an acrylate component (e.g., an acrylate monomer and/or acrylic polymer) and a urethane component (e.g., polyols, isocyanates, and/or urethane polymers).

In certain aspects, the film forming composition comprises a polysiloxane and at least one of an acrylate component (e.g., an acrylate monomer and/or acrylic polymer) or a urethane component (e.g., polyols, isocyanates, and/or urethane polymers).

In certain aspects, the film forming composition comprises a polysiloxane, an acrylate component (e.g., an acrylate monomer and/or acrylic polymer), and a urethane component (e.g., polyols, isocyanates, and/or urethane polymers).

In certain aspects, the film forming composition comprises a polysiloxane-acrylic resin/emulsion and polysiloxane-urethane resin/emulsion.

In certain aspects, the polysiloxane-acrylic resin comprises a shell-core configuration in which the polysiloxane is encapsulated by the acrylic.

In certain aspects, the organic, inorganic hybrid film forming composition comprises 10 wt % to 45 wt % of the composition.

In certain aspects, the biocide comprises encapsulated and non-encapsulated biocides.

In certain aspects, the encapsulated biocide is configured to release the biocide from the coating on a substrate post-application for a predetermined time period that includes, for example, 6 months to 5 years, 1 year to 5 years, 2 years to 5 years, or 3 years to 5 years.

In certain aspects, the encapsulated biocide comprises 0.1 wt % to 2 wt % of the composition.

In certain aspects, the non-encapsulated biocide comprises 0.1 wt % to 1 wt % of the composition.

In certain aspects, the biocide comprises a carbamate having biocidal activity.

In certain aspects, the biocide comprises a butylcarbamate having biocidal activity.

In certain aspects, the biocide comprises 3-iodo-2-propynyl butylcarbamate.

In certain aspects, the encapsulated and non-encapsulated biocide comprise at least a carbamate having biocidal activity.

In certain aspects, the encapsulated and non-encapsulated biocide comprise at least a butylcarbamate having biocidal activity.

In certain aspects, the encapsulated and non-encapsulated biocide comprise 3-iodo-2-propynyl butylcarbamate.

In certain aspects, the non-encapsulated biocide further comprises an aromatic biocide.

In certain aspects, the aromatic biocide comprises an aromatic urea compound and an aromatic carbamate.

In certain aspects, the aromatic biocide comprises 3-(3,4-dichlorophenyl)-1,1-dimethylurea, methyl 1H-benzimidazol-2-ylcarbamate, or any combination thereof.

In certain aspects, the stabilizing agent comprises 0.5 wt % to 6 wt % of the composition. In some aspects, a first stabilizing agent and a second stabilizing agent are present in the composition. In certain aspects, the first stabilizing agent comprises 0.5 wt % to 0.8 wt % of the composition. In certain aspects, the second stabilizing agent comprises 0.3 wt % to 0.4 wt % of the composition.

In certain aspects, the stabilizing agent (first stabilizing agent and second stabilizing agent) comprises an ultraviolet (UV) stabilizing agent.

In certain aspects, the first UV stabilizing agent is a heterocycle.

In certain aspects, the first UV stabilizing agent is an azine compound.

In certain aspects, the first UV stabilizing agent is a triazine compound.

In certain aspects, the first UV stabilizing agent is hydroxyphenyltriazine.

In certain aspects, the first UV stabilizing agent comprises 2-[4-[(2-Hydroxy-3-dodecyloxypropyl)oxy]-2-hydroxyphenyl]-4,6-bis(2,4-dimethylphenyl)-1,3,5-triazine, 2-[4-[(2-Hydroxy-3-tridecyloxypropyl)oxy]-2-hydroxyphenyl]-4,6-bis(2,4-dimethylphenyl)-1,3,5-triazine, or any combination thereof. In some aspects, the second UV stabilizing agent is a hindered amine and/or a heterocycle. In some aspects, the second UV stabilizing agent is a heterocyclic hindered amine. In some aspects, the second UV stabilizing agent includes, but is not limited to, hindered amine light stabilizers (HALS). In some aspects, the second UV stabilizing agent is a derivative of piperidine. In some aspects, the second UV stabilizing agent is a derivative of tetramethylpiperidine. In some aspects, the second UV stabilizing agent comprises decanedioic acid, bis(2,2,6,6-tetramethyl-1-(octyloxy)-4-piperidinyl) ester. When a first and second stabilizing agent are present in the composition, the liquid anti-fungal and/or algae resistant composition includes the first and second stabilizing agent at a ratio ranging from 1:1 to 5:1 relative to one another, more preferably 2:1 to 4:1 relative to one another.

In certain aspects, the liquid anti-fungal and/or algae resistant composition includes the biocide and film forming composition at a ratio ranging from 1:3 to 1:60.

In certain aspects, the liquid anti-fungal and/or algae resistant composition includes the non-encapsulated biocide and the encapsulated biocide at a ratio ranging from 3:1 to 1:7.

In certain aspects, the liquid anti-fungal and/or algae resistant composition includes the polysiloxane-acrylic resin and polysiloxane-urethane resin at a ratio ranging from 9:1 to 1.1:1.

In certain aspects, the liquid anti-fungal and/or algae resistant composition includes the biocide and the stabilizing agent (e.g., first and/or second stabilizing agent) at a ratio ranging from 8:1 to 1:4. When a first and second stabilizing agent are present in the composition, the liquid anti-fungal and/or algae resistant composition includes the biocide and the first stabilizing agent at a ratio ranging from 1:0.3 to 1:11, more preferably 1:0.5 to 1:10. When a first and second stabilizing agent are present in the composition, the liquid anti-fungal and/or algae resistant composition includes the biocide and the second stabilizing agent at a ratio ranging from 1:0.1 to 1:4, more preferably 1:0.5 to 1:3.

Also disclosed is a method of making the liquid anti-fungal and/or algae resistant composition comprising: (a) providing water at a concentration of up to 70 wt % of the composition; (b) mixing a biocide within the water, the biocide is present in an effective amount to prevent and/or reduce fungal and/or algal growth on the substrate post-application; (c) mixing a stabilizing agent within the water; and (d) mixing a film forming composition within the water, the film forming composition present in an effective amount to form a clear film on the substrate post-application.

Also disclosed is a method of coating a substrate comprising: (a) applying the liquid anti-fungal and/or algae resistant composition to a substrate; and (b) drying and/or curing the composition post-application to the substrate thereby forming the coated substrate.

In certain aspects, the substrate is porous or non-porous material.

In certain aspects, the substrate is a non-functionalized substrate, an electrostatically neutral substrate, or a combination thereof.

Also disclosed is an anti-fungal and/or algae resistant coating comprising: (a) a clear film; (b) a biocide dispersed within the clear film in an effective amount to prevent and/or reduce fungal and/or algal growth on and within the anti-fungal and/or algae resistant coating; and (c) a stabilizing agent dispersed within the clear film.

In certain aspects, the coating includes less than 0.01 wt % heavy metal containing components and less than 0.01 wt % fluoro containing components.

In certain aspects, the clear film is an organic, inorganic hybrid resin/emulsion.

In certain aspects, the clear film comprises a siloxane component and organic component.

In certain aspects, the clear film composition comprises one or more co-polymers.

In certain aspects, the clear film comprises a siloxane component and at least one of an acrylate component and a urethane component.

In certain aspects, the clear film comprises a polysiloxane and at least one of an acrylate component (e.g., an acrylate monomer and/or acrylic polymer) or a urethane component (e.g., polyols, isocyanates, and/or urethane polymers).

In certain aspects, the clear film comprises a polysiloxane, an acrylate component (e.g., an acrylate monomer and/or acrylic polymer), and a urethane component (e.g., polyols, isocyanates, and/or urethane polymers).

In certain aspects, the clear film comprises a polysiloxane-acrylic resin and polysiloxane-urethane resin.

In certain aspects, the polysiloxane-acrylic resin comprises a shell-core configuration in which the polysiloxane is encapsulated by the acrylic.

In certain aspects, the clear film is an organic, inorganic hybrid film at a concentration of 40 wt % to 95 wt % of the anti-fungal and/or algae resistant coating.

In certain aspects, the biocide comprises encapsulated and non-encapsulated biocides.

In certain aspects, the encapsulated biocide is configured to release the biocide from the anti-fungal and/or algae resistant coating for a predetermined time period that includes, for example, 6 months to 5 years, 1 year to 5 years, 2 years to 5 years, or 3 years to 5 years.

In certain aspects, the encapsulated biocide comprises 0.2 wt % to 7.5 wt % of the anti-fungal and/or algae resistant coating.

In certain aspects, the non-encapsulated biocide comprises 0.2 wt % to 6 wt % of the anti-fungal and/or algae resistant coating.

In certain aspects, the biocide comprises a carbamate having biocidal activity.

In certain aspects, the biocide comprises a butylcarbamate having biocidal activity.

In certain aspects, the biocide comprises 3-iodo-2-propynyl butylcarbamate.

In certain aspects, the encapsulated and non-encapsulated biocide comprise at least a carbamate having biocidal activity.

In certain aspects, the encapsulated and non-encapsulated biocide comprise at least a butylcarbamate having biocidal activity.

In certain aspects, the encapsulated and non-encapsulated biocide comprise 3-iodo-2-propynyl butylcarbamate.

In certain aspects, the non-encapsulated biocide further comprises an aromatic biocide.

In certain aspects, the aromatic biocide comprises an aromatic urea compound and an aromatic carbamate.

In certain aspects, the aromatic biocide comprises 3-(3,4-dichlorophenyl)-1,1-dimethylurea, methyl 1H-benzimidazol-2-ylcarbamate, or any combination thereof.

In certain aspects, the stabilizing agent comprises 0.3 wt % to 22 wt % of the composition. In some aspects, a first stabilizing agent and a second stabilizing agent are present in the composition. In certain aspects, the first stabilizing agent comprises 0.9 wt % to 22 wt % of the composition. In certain aspects, the second stabilizing agent comprises 0.3 wt % to 8 wt % of the composition.

In certain aspects, the stabilizing agent (first stabilizing agent and second stabilizing agent) comprises an ultraviolet (UV) stabilizing agent.

In certain aspects, the first UV stabilizing agent is a heterocycle.

In certain aspects, the first UV stabilizing agent is an azine compound.

In certain aspects, the first UV stabilizing agent is a triazine compound.

In certain aspects, the first UV stabilizing agent is hydroxyphenyltriazine.

In certain aspects, the first UV stabilizing agent comprises 2-[4-[(2-Hydroxy-3-dodecyloxypropyl)oxy]-2-hydroxyphenyl]-4,6-bis(2,4-dimethylphenyl)-1,3,5-triazine, 2-[4-[(2-Hydroxy-3-tridecyloxypropyl)oxy]-2-hydroxyphenyl]-4,6-bis(2,4-dimethylphenyl)-1,3,5-triazine, or any combination thereof. In some aspects, the second UV stabilizing agent is a hindered amine and/or a heterocycle. In some aspects, the second UV stabilizing agent is a heterocyclic hindered amine. In some aspects, the second UV stabilizing agent includes, but is not limited to, hindered amine light stabilizers (HALS). In some aspects, the second UV stabilizing agent is a derivative of piperidine. In some aspects, the second UV stabilizing agent is a derivative of tetramethylpiperidine. In some aspects, the second UV stabilizing agent comprises decanedioic acid, bis(2,2,6,6-tetramethyl-1-(octyloxy)-4-piperidinyl) ester. When a first and second UV stabilizing agent are present in the composition, the liquid anti-fungal and/or algae resistant composition includes the first and second UV stabilizing agent at a ratio ranging from 1:1 to 5:1 relative to one another, more preferably 2:1 to 4:1 relative to one another.

In certain aspects, the anti-fungal and/or algae resistant coating includes the biocide and clear film at a ratio ranging from 1:3 to 1:60.

In certain aspects, the anti-fungal and/or algae resistant coating includes the unencapsulated biocide and the encapsulated biocide at a ratio ranging from 3:1 to 1:7.

In certain aspects, the anti-fungal and/or algae resistant coating includes the polysiloxane-acrylic resin and polysiloxane-urethane resin at a ratio ranging from 9:1 to 1.1:1.

In certain aspects, the anti-fungal and/or algae resistant coating includes the biocide and the stabilizing agent (e.g., first and/or second stabilizing agent) at a ratio ranging from 8:1 to 1:4. When a first and second stabilizing agent are present in the composition, the liquid anti-fungal and/or algae resistant composition includes the biocide and the first stabilizing agent at a ratio ranging from 1:0.3 to 1:11, more preferably 1:0.5 to 1:10. When a first and second stabilizing agent are present in the composition, the liquid anti-fungal and/or algae resistant composition includes the biocide and the second stabilizing agent at a ratio ranging from 1:0.1 to 1:4, more preferably 1:0.5 to 1:3.

In certain aspects, the anti-fungal and/or algae resistant coating includes preferably less than 1 wt % water, more preferably less than 0.5 wt %, most preferably less than 0.25 wt %.

In certain aspects, the coating further comprises a substrate having the anti-fungal and/or algae resistant coating applied thereon.

In certain aspects, the substrate is porous or non-porous material.

In certain aspects, the substrate is a non-functionalized substrate, an electrostatically neutral substrate, or a combination thereof.

In certain aspects, the anti-fungal and/or algae resistant coating retains 100% gloss retention after 500 hours of UV exposure, 95% gloss retention after 1000 hours of UV exposure, 93% gloss retention after 1500 hours of UV exposure, and 93% gloss retention after 2000 hours of UV exposure (having a wavelength of approximately 340 nm and an intensity of approximately 0.89 $W/m^2$).

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed.

BRIEF DESCRIPTION OF THE DRAWINGS

The drawings described herein are for illustrative purposes for selected embodiments and not all possible implementations and are not intended to limit the scope of the present disclosure.

DETAILED DESCRIPTION

Figure 1:
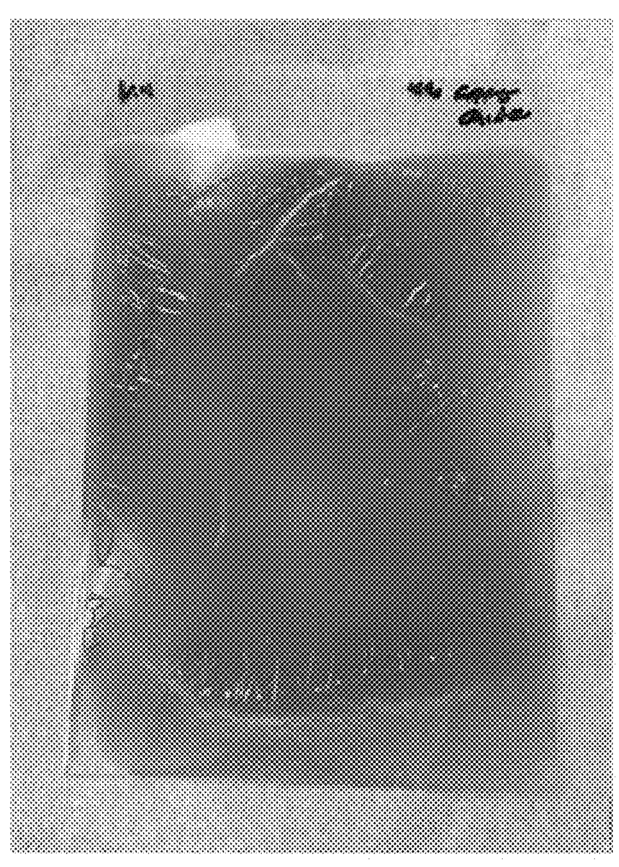
FIG. 1 is a photograph displaying the film formation on a polyester substrate after treatment with Comparative Example Coating 4.
Figure 2:
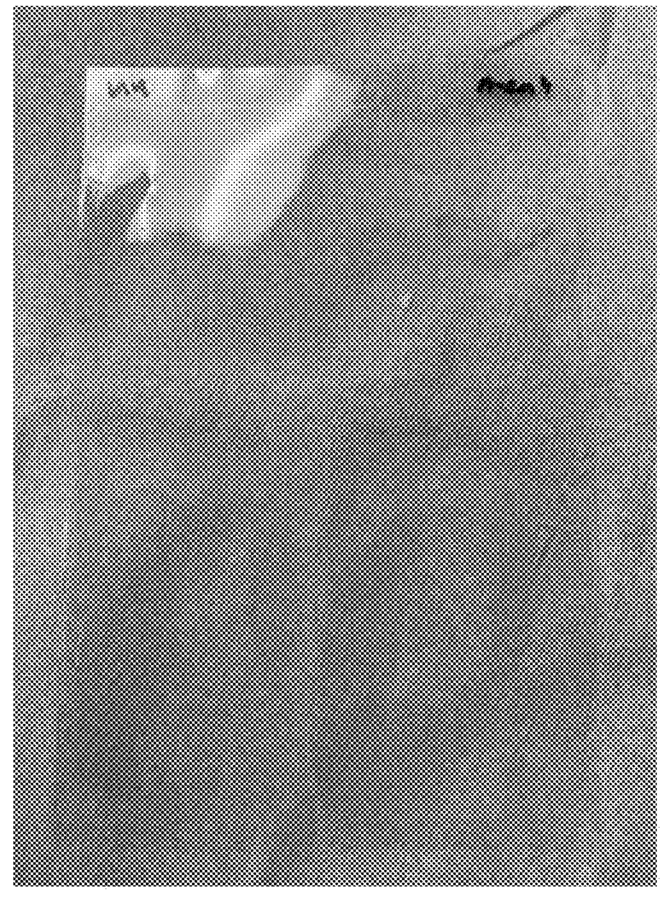
FIG. 2 is a photograph displaying the film formation on a polyester substrate after treatment with Comparative Example Coating 5 (Control).

The present invention will now be described more fully hereinafter with reference to exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use and practice the invention. Like reference numbers refer to like elements throughout the various drawings.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

Disclosed herein are liquid anti-fungal and/or algae resistant compositions that form a coating (durable, UV and/or weather resistant coating) on a substrate post-application in which the composition includes less than 0.01 wt % heavy metal containing components and less than 0.01 wt % fluoro containing components. Further disclosed herein are anti-fungal and/or algae resistant coatings applied to/on a substrate that further exhibit durability (e.g., coating stability and gloss retention) as well as anti-fungal properties and/or algae resistance for a predetermined time period. The coating includes less than 0.01 wt % heavy metal containing components and less than 0.01 wt % fluoro containing components. In certain aspects the compositions and coatings are used on exterior surfaces and substrates, which may include, but are not limited to, glass, metal, ceramic, asphalt, concrete, plastic, or any combination thereof. Moreover, the substrate may further include roofing shingles and/or roofing materials and exterior siding (e.g., vinyl siding and/or engineered wood and/or cementitious siding materials) for residential and/or commercial purposes. The compositions and coatings herein advantageously protect and maintain the substrates disclosed herein by reducing and/or eliminating fungal and/or algal growth and further advantageously reduced cleaning frequency of these substrates often associated with fungal and/or algal growth.

Liquid Anti-Fungal and/or Algae Resistant Compositions

In certain aspects, disclosed is a liquid anti-fungal and/or algae resistant composition that forms a coating on a substrate post-application comprising: (a) water at a concentration of up to 70 wt % of the composition; (b) a biocide dispersed within the water present in an effective amount to prevent and/or reduce fungal and/or algal growth on the substrate post-application; (c) a stabilizing agent dispersed within the water; and (d) a film forming composition dispersed within the water present in an effective amount to form a clear film on the substrate post-application. In certain aspects, the composition includes less than 0.01 wt % heavy metal containing components and less than 0.01 wt % fluoro containing components.

The film forming composition is present in the liquid anti-fungal and/or algae resistant composition at an effective amount to form a film (e.g., a clear film that is a transparent or translucent film) on the desired substrate post-application and drying/curing thereon. The film forming composition is preferably homogeneously dispersed within the liquid anti-fungal and/or algae resistant composition at a concentration ranging from 10 wt % to 45 wt % of the liquid anti-fungal and/or algae resistant composition, with any additional endpoint falling within the above-mentioned broad range serving as endpoints for any additional sub-range occurring therein (e.g., 20 wt % to 40 wt %, 30 wt % to 35 wt %, etc.). If film forming composition amounts fall below 10.0 wt %, inadequate/non-durable film formation occurs. While if film forming composition amounts exceed 45 wt % in the liquid anti-fungal and/or algae resistant composition, the liquid composition becomes too viscous to allow for adequate application of the liquid anti-fungal and/or algae resistant composition onto the substrate and subsequent coating formation post-cure (e.g., uneven and/or non-homogeneous application of the liquid anti-fungal and/or algae resistant composition may occur). Moreover, if the film forming composition exceeds 45 wt % of the liquid anti-fungal and/or algae resistant composition, decreased anti-fungal and/or algae resistance may occur due to the coating (i.e., formed post-drying/curing of the liquid anti-fungal and/or algae resistant composition on the substrate) being too thick, which impedes the anti-fungal and/or algae resistant properties of the biocide(s) disclosed herein. In certain aspects, the film forming composition comprises one or more co-polymers. Moreover, in certain aspects, the film forming composition is an organic, inorganic hybrid resin/emulsion, which may include a siloxane component and organic component respectively. The film forming composition may include a polysiloxane and at least one of an acrylate component (e.g., an acrylate monomer and/or acrylic polymer) or a urethane component (e.g., polyols, isocyanates, and/or urethane polymers), and more preferably the film forming composition includes a polysiloxane, an acrylate component (e.g., an acrylate monomer and/or acrylic polymer), and a urethane component (e.g., polyols, isocyanates, and/or urethane polymers). In each of the above aspects, the film forming composition preferably forms a clear film that is either a transparent or translucent film, more preferably a transparent film, post-application and post-curing/drying of the liquid anti-fungal and/or algae resistant composition on the substrate.

The film forming compositions disclosed herein preferably include two film forming compositions that synergistically interact with one another to improve dispersibility and/or miscibility and/or spreadability of the film forming composition as well as the other components (e.g., biocide and/or stabilizing agent) within the liquid anti-fungal and/or algae resistant composition as well as during application (e.g., homogenous spreading/application) to the substrate. The two film forming compositions preferably include a polysiloxane-acrylic resin (Ceranate Voncoat SA-6360 from the DIC Corporation incorporated by reference herein) and polysiloxane-urethane resin (Ceranate WHW-822 from the DIC Corporation incorporated by reference herein). The polysiloxane-acrylic resin is present (dispersed and/or homogeneously dispersed) in the liquid anti-fungal and/or algae resistant composition at a concentration ranging from 10 wt % to 35 wt % of the liquid anti-fungal and/or algae resistant composition, with any additional endpoint falling within the above-mentioned broad range serving as endpoints for any additional sub-range occurring therein (e.g., 15 wt % to 30 wt %, 20 wt % to 25 wt %, etc.). The polysiloxane-acrylic resin has a pH ranging from 8.0 to 9.5 and a viscosity ranging from 500 to 2,000 mPa·s. The polysiloxane-acrylic resin comprises a shell-core configuration in which the polysiloxane is encapsulated by the acrylic. This shell-core configuration, present in the concentrations and ratios disclosed herein, in combination with the other components at ratios disclosed herein, provides for durable film formation post curing/drying of the liquid anti-fungal and/or algae resistant composition at a concentration on the substrate. Without wishing to be bound by theory, the acrylic within the polysiloxane-acrylic resin forms an outer surface of the end resulting coating that advantageously imparts coating durability. In certain aspects, the outer acrylic surface of the coating imparts coating durability by acting as a sacrificial layer (degrades) to prolong the life of the polysiloxane core. The acrylic segment/portion of the polysiloxane-acrylic resin has a calculated Tg of 20° C. In certain aspects within the shell-core configuration, the polysiloxane is a crosslinker that crosslinks the acrylic polymer within the film forming composition, which further aids in homogeneous film formation (e.g., on a micro and/or nano-scale) and clear film durability post-drying/post-curing. Moreover, the polysiloxane-urethane resin is present (dispersed and/or homogeneously dispersed) in the liquid anti-fungal and/or algae resistant composition at a concentration ranging from 2 wt % to 10 wt % of the liquid anti-fungal and/or algae resistant composition, with any additional endpoint falling within the above-mentioned broad range serving as endpoints for any additional range occurring therein (e.g., 4 wt % to 8 wt %, 5 wt % to 7 wt %, etc.). The polysiloxane-urethane resin has a pH ranging from 7.5 to 8.5, a particle size ranging from 40 to 70 nm, and a viscosity ranging from 10 to 1000 mPa·s. The physical properties of the film when the film thickness is 200 μm include a tensile strength ranging from 5 to 10 MPa and an elongation ranging from 100 to 300%.

When two film forming compositions are included in the liquid anti-fungal and/or algae resistant composition in the above disclosed concentrations, the two film forming compositions are further included in ratios ranging from 9:1 to 1.1:1 to obtain desired dispersibility and/or desired miscibility and/or desired viscosity and/or desired film forming properties. More specifically and when polysiloxane-acrylic resin and polysiloxane-urethane resin are included as the two film forming compositions in the liquid anti-fungal and/or algae resistant composition, the polysiloxane-acrylic resin and polysiloxane-urethane resin are included in the liquid anti-fungal and/or algae resistant composition at a ratio ranging from 9:1 to 1.1:1 relative to one another or 7:1 to 1.05:1 relative to one another or 4:1 to 1:1 relative to one another, with any additional ratio falling within the above-mentioned ratios being further contemplated and included herein. The polysiloxane-acrylic resin and polysiloxane-urethane resin are included in the liquid anti-fungal and/or algae resistant composition in the above disclosed concentrations and ratios to obtain the desired dispersibility and/or desired miscibility and/or desired viscosity and/or desired film forming properties. Moreover, when two film forming compositions (polysiloxane-acrylic resin and polysiloxane-urethane resin) are included in the liquid anti-fungal and/or algae resistant composition in the above disclosed concentrations additional advantages are obtained. For example the coating resulting from the liquid anti-fungal and/or algae resistant composition having polysiloxane-acrylic resin and polysiloxane-urethane resin exhibits a desirable coating hardness and flexibility such that the coating does not readily delaminate and/or crack (e.g., due to substrate expansion/contraction from temperature fluctuations) while further advantageously providing desired gloss retention.

As alluded to above, the biocide is dispersed (preferably homogeneously dispersed) within the liquid anti-fungal and/or algae resistant composition in an effective amount to prevent and/or reduce fungal and/or algal growth on the substrate post-application. The biocide is preferably dispersed (homogeneously dispersed) within the liquid anti-fungal and/or algae resistant composition at a concentration ranging from 0.1 wt % to 3 wt % of the liquid anti-fungal and/or algae resistant composition, with any additional endpoint falling within the above-mentioned broad range serving as endpoints for any additional sub-range occurring therein (e.g., 0.5 wt % to 2.5 wt %, 1 wt % to 2 wt %, etc.). The biocide(s) include one or more of a carbamate having biocidal activity, an aromatic biocide, or any combination thereof. The carbamate having biocidal activity includes a butylcarbamate having biocidal activity and more preferably 3-iodo-2-propynyl butylcarbamate. While the aromatic biocide includes, but is not limited to, an aromatic urea compound and/or an aromatic carbamate, which includes, but is not limited to, 3-(3,4-dichlorophenyl)-1,1-dimethylurea, methyl 1H-benzimidazol-2-ylcarbamate, or any combination thereof.

In certain aspects, the biocide includes both encapsulated and non-encapsulated biocides, which advantageously provides the coating (post-application of the liquid anti-fungal and/or algae resistant composition and drying/curing on the substrate) a time-released biocidal activity resulting in anti-fungal properties and/or algae resistance for an extended period of time (e.g., up to 5 years). More specifically, in certain aspects, the encapsulated biocide is configured to release the biocide from the coating on a substrate post-application for 6 months to 5 years, 1 year to 5 years, 2 years to 5 years, or 3 years to 5 years. The encapsulated biocide (IPBC (Polyphase PW20 EPA Registration No. 5383-197 Arxada (2023)) incorporated by reference herein) comprises 0.1 wt % to 2 wt % of the liquid anti-fungal and/or algae resistant composition, with any additional endpoint falling within the above-mentioned broad range serving as endpoints for any additional sub-range occurring therein (e.g., 0.5 wt % to 1.5 wt %, 1.0 wt % to 1.2 wt %, etc.). The encapsulated biocide has a pH ranging from 6.0 to 8.0 and a specific gravity ranging from 1.15 to 1.18 at 25° C. Moreover the encapsulated biocide is preferably homogeneously dispersed within the liquid anti-fungal and/or algae resistant composition, which further aids in liquid anti-fungal and/or algae resistant composition application ease and efficacy post-application onto to the substrate. In certain aspects, the encapsulated biocide is water insoluble, thus preventing leaching into the environment with minimal leaching over prolonged time periods. The encapsulated biocide includes a carbamate having biocidal activity, more preferably a butylcarbamate having biocidal activity, and most preferably is 3-iodo-2-propynyl butylcarbamate.

The non-encapsulated biocide (Diuron, BCM, IPBC (Polyphase 663 EPA Registration No. 5383-109; Product Code 10614 Troy Corporation (2016)) incorporated by reference herein) comprises 0.1 wt % to 1 wt % of the liquid anti-fungal and/or algae resistant composition, with any additional endpoint falling within the above-mentioned broad range serving as endpoints for any additional range occurring therein (e.g., 0.2 wt % to 0.8 wt %, 0.5 wt % to 0.7 wt %, etc.). The non-encapsulated biocide has a pH ranging from 7.0 to 8.0, a viscosity of 300 cPs at ambient temperature, and a specific gravity of 1.15 g/cc. Moreover the non-encapsulated biocide is preferably homogeneously dispersed within the liquid anti-fungal and/or algae resistant composition, which further aids in liquid anti-fungal and/or algae resistant composition application ease and efficacy onto the substrate. In certain aspects, the non-encapsulated biocide is water insoluble, thus preventing leaching into the environment with minimal leaching over prolonged time periods. The non-encapsulated biocide includes one or more of a carbamate having biocidal activity, an aromatic biocide, or any combination thereof. The carbamate having biocidal activity includes a butylcarbamate having biocidal activity and more preferably 3-iodo-2-propynyl butylcarbamate. While the aromatic biocide includes, but is not limited to, an aromatic urea compound and/or an aromatic carbamate, which includes, but is not limited to, 3-(3,4-dichlorophenyl)-1,1-dimethylurea, methyl 1H-benzimidazol-2-ylcarbamate, or any combination thereof. In certain aspects, the non-encapsulated biocide includes carbamate having biocidal activity and an aromatic biocide(s) including, but is not limited to, an aromatic urea compound and/or an aromatic carbamate. In certain preferred aspects, the non-encapsulated biocide includes 3-(3,4-dichlorophenyl)-1,1-dimethylurea (Diuron), 3-iodo-2-propynyl butylcarbamate (IPBC), methyl 1H-benzimidazol-2-ylcarbamate (BCM), or any combination thereof. In certain aspects, Diuron and IPBC are present at a ratio of 6:1 to 2:1 relative to one another, of 5:1 to 3:1 relative to one another with any additional ratio falling within the above-mentioned ratios being further contemplated and included herein. In certain aspects, BCM and IPBC are present at a ratio of 4:1 to 2:1 relative to one another, of 3:1 to 2:1 relative to one another with any additional ratio falling within the above-mentioned ratios being further contemplated and included herein. In certain aspects, Diuron and BCM are present at a ratio of 2:1 to 1:1.5 relative to one another, of 1.8:1 to 1:1 relative to one another with any additional ratio falling within the above-mentioned ratios being further contemplated and included herein.

In certain aspects, the liquid anti-fungal and/or algae resistant composition includes the non-encapsulated biocide and the encapsulated biocide at a ratio ranging from 3:1 to 1:7 relative to one another or 2.5:1 to 1:6 relative to one another or 2:1 to 1:5 relative to one another or 1.5:1 to 1:4 relative to one another or 1:1 to 1:3 relative to one another, with any additional ratio falling within the above-mentioned ratios being further contemplated and included herein. The non-encapsulated biocide and encapsulated biocide are included in the liquid anti-fungal and/or algae resistant composition in the above disclosed concentrations and ratios to obtain the desired prolonged and/or durable biocidal activity within the coating (post-application and drying/curing on the substrate). Biocide ratios and concentrations falling below those disclosed herein do not provide for the desired prolonged and/or durable biocidal activity within the coating (post-application and drying/curing on the substrate). While biocide ratios and concentrations exceeding those disclosed herein do not provide for increased anti-fungal activity/efficacy and/or algae resistance.

In certain aspects, the liquid anti-fungal and/or algae resistant composition includes the biocide (e.g., total encapsulated and non-encapsulated biocide) and film forming composition at a ratio ranging from 1:3 to 1:60 relative to one another or 1:7 to 1:50 relative to one another or 1:10 to 1:25 relative to one another, with any additional ratio falling within the above-mentioned ratios being further contemplated and included herein. If the film forming composition exceeds the concentrations and/or ratios disclosed herein, the liquid composition becomes too viscous to allow for adequate application of the liquid anti-fungal and/or algae resistant composition onto the substrate and subsequent coating formation post-cure (e.g., uneven and/or non-homogeneous application of the liquid anti-fungal and/or algae resistant composition may occur). Moreover, decreased anti-fungal and/or algae resistance may occur due to the coating (i.e., formed post-drying/curing of the liquid anti-fungal and/or algae resistant composition on the substrate) being too thick, which impedes the anti-fungal and/or algae resistant properties of the biocide(s) disclosed herein.

To enhance stability of the liquid anti-fungal and/or algae resistant composition as well as the coating (post-application and curing/drying on a substrate) a stabilizing agent is included in liquid anti-fungal and/or algae resistant composition (and preferably homogeneously dispersed therein). The stabilizing agent comprises 0.5 wt % to 6 wt % of the composition, with any additional endpoint falling within the above-mentioned broad range serving as endpoints for any additional sub-range occurring therein (e.g., 1.0 wt % to 5.0 wt %, 2.0 wt % to 3.0 wt %, etc.). In certain aspects, the active concentration of the first stabilizing agent comprises 0.5 wt % to 0.8 wt % of the liquid anti-fungal and/or algae resistant composition, with any additional endpoint falling within the above-mentioned broad range serving as endpoints for any additional sub-range occurring therein (e.g., 0.6 wt % to 0.7 wt %, etc.). The active concentration of the first stabilizing agent is 0.5 wt % to 0.8 wt % of the liquid anti-fungal and/or algae resistant composition because the first stabilizing agent added to the solution included 80% non-active stabilizing agent (e.g., fillers, carriers, etc.). Thus, 0.2 (i.e., 20%) multiplied by 2.5 wt % equals 0.5 wt %. In certain aspects, the first stabilizing agent comprises an ultraviolet (UV) stabilizing agent that includes a heterocycle and/or an azine compound. In certain preferred aspects, the first UV stabilizing agent is a triazine compound and is more specifically hydroxyphenyltriazine (e.g., Tinuvin® 400-DW ECO Technical Data Sheet BASF (April 2022) incorporated by reference herein). The most preferred being 2-[4-[(2-Hydroxy-3-dodecyloxypropyl)oxy]-2-hydroxyphenyl]-4,6-bis(2,4-dimethylphenyl)-1,3,5-triazine, 2-[4-[(2-Hydroxy-3-tridecyloxypropyl)oxy]-2-hydroxyphenyl]-4,6-bis(2,4-dimethylphenyl)-1,3,5-triazine, or any combination thereof. In certain aspects, a second stabilizing agent is also included. In certain aspects, the active concentration of the second stabilizing agent comprises 0.3 wt % to 0.4 wt % of the liquid anti-fungal and/or algae resistant composition, with any additional endpoint falling within the above-mentioned broad range serving as endpoints for any additional sub-range occurring therein (e.g., 0.3 wt % to 0.35 wt %, etc.). The active concentration of the second stabilizing agent is 0.3 wt % to 0.4 wt % of the liquid anti-fungal and/or algae resistant composition because the second stabilizing agent added to the solution included 80% non-active stabilizing agent (e.g., fillers, carriers, etc.). Thus, 0.2 (i.e., 20%) multiplied by 1.5 wt % equals 0.3 wt %. In some aspects, the second UV stabilizing agent comprises an ultraviolet (UV) stabilizing agent that includes a hindered amine and/or heterocyclic. In certain preferred aspects, the second UV stabilizing agent is a heterocyclic hindered amine. In some aspects, the second UV stabilizing agent includes, but is not limited to, hindered amine light stabilizers (HALS). In some aspects, the second UV stabilizing agent is a derivative of piperidine. In some aspects, the second UV stabilizing agent is a derivative of tetramethylpiperidine and is more specifically decanedioic acid, bis(2,2,6,6-tetramethyl-1-(octyloxy)-4-piperidinyl) ester (e.g., Tinuvin® 123-DW ECO Technical Data Sheet BASF (April 2022) incorporated by reference herein). In certain aspects, a combination of the first and second UV stabilizing agents are used due to the synergistic effects. When the first and second stabilizing agents as disclosed above are present in the composition at the concentration and/or ratios disclosed above, the first and second stabilizing agents preferably interact synergistically with one another to provide the best protection against UV radiation. The first UV stabilizing agent (i.e., UV absorbers) and the second UV stabilizing agent (i.e., HALS) each work through different mechanisms. Thus, combining both types of UV stabilizing agents ensures the highest amount of protection against UV radiation.

In addition, the liquid anti-fungal and/or algae resistant composition includes the biocide and the stabilizing agent at a ratio ranging from 8:1 to 1:4 relative to one another or 6.5:1 to 1:3.5 relative to another or 4:1 to 1:2.5 relative to one another, with any additional ratio falling within the above-mentioned ratios being further contemplated and included herein.

In view of the above, water is included in liquid anti-fungal and/or algae resistant composition at a concentration of up to 70 wt % of the composition, with any additional endpoint falling within the above-mentioned broad range serving as endpoints for any additional sub-range occurring therein (e.g., 5.0 wt % to 65.0 wt %, 10.0 wt % to 50.0 wt %, etc.). The liquid anti-fungal and/or algae resistant composition has a pH ranging from 7.0 to 10.0, more preferably a pH ranging from 7.5 to 9.5, with any additional endpoint falling within the above-mentioned broad range serving as endpoints for any additional sub-range occurring therein (e.g., 8.0 to 9.0, 8.5 to 9.0, etc.). The liquid anti-fungal and/or algae resistant composition has a viscosity ranging from 225 to 275 cPs at ambient temperature, with any additional endpoint falling within the above-mentioned broad range serving as endpoints for any additional sub-range occurring therein (e.g., 230 cPs to 270 cPs, 240 cPs to 260 cPs, etc.).

Methods of Making Liquid Anti-Fungal and/or Algae Resistant Compositions

Also disclosed is a method of making the liquid anti-fungal and/or algae resistant composition comprising: (a) providing water at a concentration of up to 70 wt % of the composition; (b) mixing a biocide within the water, the biocide is present in an effective amount to prevent and/or reduce fungal and/or algal growth on the substrate post-application; (c) mixing a stabilizing agent within the water; and (d) mixing a film forming composition within the water, the film forming composition present in an effective amount to form a clear film (e.g., transparent or translucent film) on the substrate post-application. In certain aspects, the biocide, stabilizing agent, and film forming compositions may include any of the concentrations and/or ratios disclosed above when making the liquid anti-fungal and/or algae resistant composition. In preferred aspects, the biocide, stabilizing agent, film forming compositions or any combination thereof are homogeneously and/or uniformly dispersed within the liquid anti-fungal and/or algae resistant composition to obtain desired viscosity and/or pH of the liquid anti-fungal and/or algae resistant composition, desired spreadability/application properties of the liquid anti-fungal and/or algae resistant composition onto the substrate (e.g., uniform and/or homogeneous spreadability/application), and/or desired film forming properties (post-application and drying/curing on the substrate).

Methods of Coating a Substrate with the Liquid Anti-Fungal and/or Algae Resistant Compositions Also disclosed is a method of coating a substrate comprising: (a) applying the liquid anti-fungal and/or algae resistant composition disclosed herein to the substrate(s) disclosed herein; and (b) drying and/or curing the composition post-application to the substrate thereby forming the coated substrate. In certain aspects, drying and/or curing of step (b) occurs at temperatures range from 25° C. to 150° C. for 5 hours to 35 hours with any additional endpoint falling within the above-mentioned broad range serving as endpoints for any additional sub-range occurring therein (e.g., 50° C. to 125° C. for 10 hours to 30 hours, 75° C. to 100° C. for 15 hours to 25 hours, etc.).

Before applying the liquid anti-fungal and/or algae resistant composition to the substrate, the liquid anti-fungal and/or algae resistant composition should be thoroughly mixed such that the liquid anti-fungal and/or algae resistant composition is translucent and/or slightly hazy after thorough mixing and/or when the composition is thoroughly mixed having its various components homogeneously dispersed therein.

In certain aspects, the substrate is porous or non-porous material. The substrate may include glass, metal, ceramic, asphalt, concrete, plastic, or any combination thereof. The substrate may further include substrates intended for exterior use and/or building purposes such as roofing shingles and/or roofing materials and exterior siding (e.g., vinyl siding and/or engineered wood and/or cementitious siding materials for residential and/or commercial purposes).

The liquid anti-fungal and/or algae resistant composition may be applied by a variety of application methods including spray coating, roll coating, dip coating, brush coating, fluidized bed spray, etc. In certain aspects, the coated substrate has the anti-fungal and/or algae resistant coating homogeneously applied on the substrate. In certain aspects, the coating remains on the substrate for 6 months to 5 years, 1 year to 5 years, 2 years to 5 years, or 3 years to 5 years. In certain aspects, the substrate is a non-functionalized substrate, an electrostatically neutral substrate, or a combination thereof in which the coating is physically bonded/bound to the substrate by Van der Waals forces(s) and/or by hydrogen bonding.

Anti-Fungal and/or Algae Resistant Coating

The anti-fungal and/or algae resistant coating is formed on the substrate post-application and drying/curing of the liquid anti-fungal and/or algae resistant composition to the substrate. In certain aspects, the substrate is a non-functionalized substrate, an electrostatically neutral substrate, or a combination thereof in which the coating is physically bonded/bound to the substrate by Van der Waals forces(s) and/or by hydrogen bonding and has an overall thickness ranging from 0.4 mils (10 μm) to 10 mils (250 μm), with any additional endpoint falling within this broad range serving as endpoints for any additional sub-range thicknesses occurring therein. In preferred embodiments, the anti-fungal and/or algae resistant coating has a uniform (and/or substantially uniform) and/or even thickness (and/or substantially even thickness) (e.g., when viewed in cross-section) along with the biocide and/or any other chemical components homogeneously dispersed (and/or substantially homogeneously dispersed) within and/or throughout the anti-fungal and/or algae resistant coating.

In particular, the anti-fungal and/or algae resistant coating includes (a) a clear film (formed from the film forming composition in the liquid anti-fungal and/or algae resistant composition post-drying and/or post-curing); (b) a biocide dispersed within the clear film in an effective amount to prevent and/or reduce fungal and/or algal growth on and within the anti-fungal and/or algae resistant coating for 6 months to 5 years, 1 year to 5 years, 2 years to 5 years, or 3 years to 5 years; and (c) a stabilizing agent dispersed within the clear film. The coating preferably includes less than 0.01 wt % heavy metal containing components and less than 0.01 wt % fluoro containing components, and more preferably does not include any heavy metal containing components and/or fluoro contacting components. Moreover, the coating includes preferably less than 1 wt % water, more preferably less than 0.5 wt %, most preferably less than 0.25 wt %. In certain aspects, the anti-fungal and/or algae resistant coating is hydrophobic and has a contact angle ranging from 75° to 85°, preferably 80° to 85°. The coating's hydrophobic properties advantageously increases coating lifespan and biocidal activity, especially when compared with coating having hydrophilic properties, due to the coating's water resistance that minimize expansion and contraction (e.g., swelling) associated with water absorption during inclement weather and/or outdoor seasonal thermal cycles.

The clear film is present in the liquid anti-fungal and/or algae resistant coating at a concentration ranging from 40 wt % to 95 wt % of the liquid anti-fungal and/or algae resistant coating, with any additional endpoint falling within the above-mentioned broad range serving as endpoints for any additional sub-range occurring therein (e.g., 45 wt % to 90 wt %, 50 wt % to 85 wt %, etc.). If clear film concentrations fall below 40 wt %, the film as well as the coating exhibits inadequate/non-durable properties. While if the clear film concentrations exceed 95 wt % in the anti-fungal and/or algae resistant coating, the coating is uneven and/or non-homogeneous and further exhibits decreased anti-fungal and/or algae resistance due to the coating thickness potentially impeding the anti-fungal and/or algae resistant properties of the biocide(s) disclosed herein.

In certain aspects, the clear film includes one or more co-polymers. Moreover, in certain aspects, the clear film forming includes an organic, inorganic hybrid resin, which preferably includes a siloxane component and organic component respectively. The clear film may include a polysiloxane and at least one of an acrylate component (e.g., an acrylate monomer and/or acrylic polymer) or a urethane component (e.g., polyols, isocyanates, and/or urethane polymers), and more preferably includes a polysiloxane, an acrylate component (e.g., an acrylate monomer and/or acrylic polymer), and a urethane component (e.g., polyols, isocyanates, and/or urethane polymers). In each of the above aspects, the clear film is either a transparent or translucent film formed on the substrate, preferably a transparent film. The transparent film has a haze value between 10-11 on the spectrophotometer. The transparent film is less hazy and therefore produces a film that is visibly more aesthetically pleasing than other films.

The clear film preferably includes a polysiloxane-acrylic resin (Ceranate Voncoat SA-6360 from the DIC Corporation incorporated by reference herein) and polysiloxane-urethane resin (Ceranate WHW-822 from the DIC Corporation incorporated by reference herein). The polysiloxane-acrylic resin is present in the anti-fungal and/or algae resistant coating at a concentration ranging from 35 wt % to 90 wt % of the anti-fungal and/or algae resistant coating, with any additional endpoint falling within the above-mentioned broad range serving as endpoints for any additional sub-range occurring therein (e.g., 45 wt % to 85 wt %, 55 wt % to 75 wt %, etc.). The polysiloxane-acrylic resin has a pH ranging from 8.0 to 9.5 and a viscosity ranging from 500 to 2,000 mPa·s. The polysiloxane-acrylic resin comprises a shell-core configuration in which the polysiloxane is encapsulated by the acrylic. This shell-core configuration, present in the concentrations and ratios disclosed herein in combination with the other components at ratios disclosed herein, provides for a durable clear film configured to impart efficacious anti-fungal and/or algae resistant coating for a predetermined time period when combined with the biocide(s) and other components disclosed herein. The anti-fungal and/or algae resistant coating is hydrophobic and has a contact angle ranging from 75° to 85°, preferably 80° to 85°. This property extends the life of the coating and biocide due to the water resistance which results in the lack of swelling when in contact with water. Without wishing to be bound by theory, the acrylic within the polysiloxane-acrylic resin forms an outer surface of the coating that advantageously imparts coating durability. In certain aspects, the outer acrylic surface of the coating imparts coating durability by acting as a sacrificial layer (degrades) to prolong the life of the polysiloxane core. The acrylic segment/portion of the polysiloxane-acrylic resin has a calculated Tg of 20° C. In certain aspects within the shell-core configuration, the polysiloxane is a crosslinker that crosslinks the acrylic polymer within the clear film which further aids in film homogeneity and thickness post-application/formation on the substrate. Moreover, the polysiloxane-urethane resin is present (dispersed and/or homogeneously dispersed) in the anti-fungal and/or algae resistant coating at a concentration ranging from 5 wt % to 45 wt % of the anti-fungal and/or algae resistant coating, with any additional endpoint falling within the above-mentioned broad range serving as endpoints for any additional range occurring therein (e.g., 7.5 wt % to 35 wt %, 10 wt % to 30 wt %, etc.). The polysiloxane-urethane resin has a pH ranging from 7.5 to 8.5, a particle size ranging from 40 to 70 nm, and a viscosity ranging from 10 to 1000 mPa·s. The physical properties of the film when the film thickness is 200 μm include a tensile strength ranging from 5 to 10 MPa and an elongation ranging from 100 to 300%.

When polysiloxane-acrylic resin and polysiloxane-urethane resin are included in the clear film, the polysiloxane-acrylic resin and polysiloxane-urethane resin are included in the anti-fungal and/or algae resistant coating at a ratio ranging from 9:1 to 1.1:1 relative to one another or 7:1 to 1.05:1 relative to one another or 4:1 to 1:1 relative to one another, with any additional ratio falling within the above-mentioned ratios being further contemplated and included herein. The polysiloxane-acrylic resin and polysiloxane-urethane resin are included in the anti-fungal and/or algae resistant coating in the above disclosed concentrations and ratios to obtain the desired clear film thickness, hardness, flexibility, and/or durability when exposed to repeated thermal fluctuations and/or other stresses such as ultraviolet (UV) exposure. For example, the coating having polysiloxane-acrylic resin and polysiloxane-urethane resin therein exhibits a desirable coating hardness and flexibility such that the coating does not readily delaminate and/or crack (e.g., due to substrate expansion/contraction from temperature fluctuations, inclement weather, and/or seasonal changes) while further advantageously providing desired gloss retention.

The biocide is dispersed (preferably homogeneously dispersed) within the anti-fungal and/or algae resistant coating in an effective amount to prevent and/or reduce fungal and/or algal growth on, for example, the substrate for a pre-determined period of time. The biocide is preferably dispersed (homogeneously dispersed) within the anti-fungal and/or algae resistant coating at a concentration ranging from 0.5 wt % to 15 wt % of the liquid anti-fungal and/or algae resistant coating, with any additional endpoint falling within the above-mentioned broad range serving as endpoints for any additional sub-range occurring therein (e.g., 2 wt % to 9.5 wt %, 3 wt % to 8 wt %, etc.). The biocide(s) include one or more of a carbamate having biocidal activity, an aromatic biocide, or any combination thereof. The carbamate having biocidal activity includes a butylcarbamate having biocidal activity and more preferably 3-iodo-2-propynyl butylcarbamate. While the aromatic biocide includes, but is not limited to, an aromatic urea compound and/or an aromatic carbamate, which includes, but is not limited to, 3-(3,4-dichlorophenyl)-1,1-dimethylurea, methyl 1H-benzimidazol-2-ylcarbamate, or any combination thereof.

In certain aspects, the biocide includes both encapsulated and non-encapsulated biocides, which advantageously provides the coating with a time-released biocidal activity resulting in anti-fungal properties and/or algae resistance for an extended period of time (e.g., up to 5 years). More specifically, in certain aspects, the encapsulated biocide is configured to release the biocide from the coating over a predetermined period of time including, for example, 6 months to 5 years, 1 year to 5 years, 2 years to 5 years, or 3 years to 5 years thereby exhibiting a desired predetermined anti-fungal and algae resistant activity. The encapsulated biocide (IPBC (Polyphase PW20 EPA Registration No. 5383-197 Arxada (2023)) incorporated by reference herein) comprises 0.2 wt % to 7.5 wt % of the anti-fungal and/or algae resistant coating, with any additional endpoint falling within the above-mentioned broad range serving as endpoints for any additional sub-range occurring therein (e.g., 1 wt % to 4.5 wt %, 1.5 wt % to 4 wt %, etc.). The encapsulated biocide has a pH ranging from 6.0 to 8.0 and a specific gravity ranging from 1.15 to 1.18 at 25° C. Moreover the encapsulated biocide is preferably homogeneously dispersed within the anti-fungal and/or algae resistant coating thereby imparting uniform anti-fungal and/or algae resistant properties to and throughout the anti-fungal and/or algae resistant coating. In certain aspects, the encapsulated biocide is water insoluble, thus preventing leaching into the environment with minimal leaching over prolonged time periods. The encapsulated biocide includes a carbamate having biocidal activity, more preferably a butylcarbamate having biocidal activity, and most preferably is 3-iodo-2-propynyl butylcarbamate.

The non-encapsulated biocide (Diuron, BCM, IPBC (Polyphase 663 EPA Registration No. 5383-109; Product Code 10614 Troy Corporation (2016)) incorporated by reference herein) comprises 0.2 wt % to 6 wt % of the anti-fungal and/or algae resistant coating, with any additional endpoint falling within the above-mentioned broad range serving as endpoints for any additional range occurring therein (e.g., 1 wt % to 5 wt %, 1.5 wt % to 3.75 wt %, etc.). The non-encapsulated biocide has a pH ranging from 7.0 to 8.0, a viscosity of 300 cPs at ambient temperature, and a specific gravity of 1.15 g/cc. Moreover, the non-encapsulated biocide is preferably homogeneously dispersed within the anti-fungal and/or algae resistant coating thereby imparting uniform anti-fungal and/or algae resistant properties to and throughout the anti-fungal and/or algae resistant coating. In certain aspects, the non-encapsulated biocide is water insoluble, thus preventing leaching into the environment with minimal leaching over prolonged time periods. The non-encapsulated biocide includes one or more of a carbamate having biocidal activity, an aromatic biocide, or any combination thereof. The carbamate having biocidal activity includes a butylcarbamate having biocidal activity and more preferably 3-iodo-2-propynyl butylcarbamate. While the aromatic biocide includes, but is not limited to, an aromatic urea compound and/or an aromatic carbamate, which includes, but is not limited to, 3-(3,4-dichlorophenyl)-1,1-dimethylurea, methyl 1H-benzimidazol-2-ylcarbamate, or any combination thereof. In certain aspects, the non-encapsulated biocide includes carbamate having biocidal activity and an aromatic biocide(s) including, but is not limited to, an aromatic urea compound and/or an aromatic carbamate. In certain preferred aspects, the non-encapsulated biocide includes 3-(3,4-dichlorophenyl)-1,1-dimethylurea (Diuron), 3-iodo-2-propynyl butylcarbamate (IPBC), methyl 1H-benzimidazol-2-ylcarbamate (BCM), or any combination thereof. In certain aspects, Diuron and IPBC are present at a ratio of 6:1 to 2:1 relative to one another, of 5:1 to 3:1 relative to one another with any additional ratio falling within the above-mentioned ratios being further contemplated and included herein. In certain aspects, BCM and IPBC are present at a ratio of 4:1 to 2:1 relative to one another, of 3:1 to 2:1 relative to one another with any additional ratio falling within the above-mentioned ratios being further contemplated and included herein. In certain aspects, Diuron and BCM are present at a ratio of 2:1 to 1:1.5 relative to one another, of 1.8:1 to 1:1 relative to one another with any additional ratio falling within the above-mentioned ratios being further contemplated and included herein.

In certain aspects, the anti-fungal and/or algae resistant coating includes the non-encapsulated biocide and the encapsulated biocide at a ratio ranging from 3:1 to 1:7 relative to one another or 1.5:1 to 1:2.5 relative to one another or 1.25:1 to 1:2 relative to one another or 1:1.05 to 1:1.5 relative to one another, with any additional ratio falling within the above-mentioned ratios being further contemplated and included herein. The non-encapsulated biocide and encapsulated biocide are included in the anti-fungal and/or algae resistant coating in the above disclosed concentrations and ratios to obtain the desired prolonged and/or durable biocidal activity within the coating. Biocide ratios and concentrations falling below those disclosed herein do not provide for the desired prolonged and/or durable biocidal activity within the coating. While biocide ratios and concentrations exceeding those disclosed herein do not provide increased anti-fungal activity/efficacy and/or algae resistance and may further disadvantageously result in a hazy film/coating appearance that is aesthetically unpleasing and/or distorts visual appearance of the substrate. Additionally, exceeding the biocide ratios and concentrations disclosed herein exceeds the label limits permitted, by for example the US Environmental Protection Agency (EPA), for these biocides as well as unnecessarily increases potential leaching concentrations.

In certain aspects, the anti-fungal and/or algae resistant coating includes the biocide (e.g., total encapsulated and non-encapsulated biocide) and the clear film at a ratio ranging from 1:3 to 1:60 relative to one another or 1:7 to 1:50 relative to one another or 1:10 to 1:25 relative to one another, with any additional ratio falling within the above-mentioned ratios being further contemplated and included herein. If the clear film exceeds the concentrations and/or ratios disclosed herein uneven and/or non-homogeneous coating formation occurs. Moreover, decreased anti-fungal and/or algae resistance may occur due to the coating being too thick, which impedes the anti-fungal and/or algae resistant properties of the biocide(s) disclosed herein.

To enhance stability of the anti-fungal and/or algae resistant coating a stabilizing agent is included in the anti-fungal and/or algae resistant coating (and preferably homogeneously dispersed therein). The stabilizing agent comprises 0.3 wt % to 22 wt % of the anti-fungal and/or algae resistant coating, with any additional endpoint falling within the above-mentioned broad range serving as endpoints for any additional sub-range occurring therein (e.g., 2.5 wt % to 20 wt %, 7.5 wt % to 15 wt %, etc.). In certain aspects, the active concentration of the first stabilizing agent comprises 0.9 wt % to 22 wt % of the anti-fungal and/or algae resistant coating, with any additional endpoint falling within the above-mentioned broad range serving as endpoints for any additional sub-range occurring therein (e.g., 3 wt % to 20 wt %, 8 wt % to 15 wt %, etc.). The active concentration of the first stabilizing agent is 0.9 wt % to 22 wt % of the anti-fungal and/or algae resistant coating because the first stabilizing agent added to the solution included 80% non-active stabilizing agent (e.g., fillers, carriers, etc.). Thus, 0.2 (i.e., 20%) multiplied by 4.5 wt % equals 0.9 wt %. In certain aspects, the first stabilizing agent comprises an ultraviolet (UV) stabilizing agent that includes a heterocycle and/or an azine compound. In certain preferred aspects, the first UV stabilizing agent is a triazine compound and is more specifically hydroxyphenyltriazine (e.g., Tinuvin® 400-DW ECO Technical Data Sheet BASF (April 2022) incorporated by reference herein). The most preferred being 2-[4-[(2-Hydroxy-3-dodecyloxypropyl)oxy]-2-hydroxyphenyl]-4,6-bis(2,4-dimethylphenyl)-1,3,5-triazine, 2-[4-[(2-Hydroxy-3-tridecyloxypropyl)oxy]-2-hydroxyphenyl]-4,6-bis(2,4-dimethylphenyl)-1,3,5-triazine, or any combination thereof. In certain aspects, a second stabilizing agent is also included. In certain aspects, the active concentration of the second stabilizing agent comprises 0.3 wt % to 8 wt % of the anti-fungal and/or algae resistant coating, with any additional endpoint falling within the above-mentioned broad range serving as endpoints for any additional sub-range occurring therein (e.g., 2 wt % to 6 wt %, 4 wt % to 5 wt %, etc.). The active concentration of the second stabilizing agent is 0.3 wt % to 8 wt % of the anti-fungal and/or algae resistant coating because the second stabilizing agent added to the solution included 80% non-active stabilizing agent (e.g., fillers, carriers, etc.). Thus, 0.2 (i.e., 20%) multiplied by 1.5 wt % equals 0.3 wt %. In some aspects, the second UV stabilizing agent comprises an ultraviolet (UV) stabilizing agent that includes a hindered amine and/or heterocyclic. In certain preferred aspects, the second UV stabilizing agent is a heterocyclic hindered amine. In some aspects, the second UV stabilizing agent includes, but is not limited to, hindered amine light stabilizers (HALS). In some aspects, the second UV stabilizing agent is a derivative of piperidine. In some aspects, the second UV stabilizing agent is a derivative of tetramethylpiperidine and is more specifically decanedioic acid, bis(2,2,6,6-tetramethyl-1-(octyloxy)-4-piperidinyl) ester (e.g., Tinuvin® 123-DW ECO Technical Data Sheet BASF (April 2022) incorporated by reference herein). In certain aspects, a combination of the first and second UV stabilizing agents are used due to the synergistic effects. When the first and second stabilizing agents as disclosed above are present in the composition at the concentration and/or ratios disclosed above, the first and second stabilizing agents preferably interact synergistically with one another to provide the best protection against UV radiation. The first UV stabilizing agent (i.e., UV absorbers) and the second UV stabilizing agent (i.e., HALS) each work through different mechanisms. Thus, combining both types of UV stabilizing agents ensures the highest amount of protection against UV radiation.

In addition, the anti-fungal and/or algae resistant coating includes the biocide and the stabilizing agent at a ratio ranging from 8:1 to 1:4 relative to one another or 6.5:1 to 1:3.5 relative to another or 4:1 to 1:2.5 relative to one another, with any additional ratio falling within the above-mentioned ratios being further contemplated and included herein.

The substrate on which the anti-fungal and/or algae resistant coating is formed is porous or non-porous material and is preferably a non-functionalized substrate, an electrostatically neutral substrate, or a combination thereof. In certain aspects the substrates include, but are not limited to, glass, metal, ceramic, asphalt, concrete, plastic, or any combination thereof. Moreover, the substrate may further include roofing shingles and/or roofing materials and exterior siding (e.g., vinyl siding and/or engineered wood and/or cementitious siding materials such as Hardie® Plank by JamesHardie™) for residential and/or commercial purposes.

In certain aspects, the anti-fungal and/or algae resistant coating retains 100% gloss retention after 500 hours of UV exposure, 95% gloss retention after 1000 hours of UV exposure, 93% gloss retention after 1500 hours of UV exposure, and 93% gloss retention after 2000 hours of UV exposure (having a wavelength of approximately 340 nm and an intensity of approximately 0.89 W/m$^2$).

Working Examples

Table 1 discloses a liquid coating composition (i.e., the liquid anti-fungal and/or algae resistant composition as disclosed herein) and ranges of components in the liquid coating composition pre-application to a substrate. Table 1 further discloses the dry coating composition (i.e., anti-fungal and/or algae resistant coating as disclosed herein) and ranges of components in the dry coating composition post-application and drying/curing on the substrate.

TABLE 1

| Components of Coating Composition | Liquid Coating Composition (wt %) | Dry Coating Composition (wt %) |
|---|---|---|
| Water | 51.5-86.5 | 0 |
| Polysiloxane-Acrylic Resin/Emulsion | 10.0-32.5 | 40.2-89.5 |
| Polysiloxane-Urethane Resin/Emulsion | 2.6-8.8 | 6.2-43.9 |
| First and/or Second Stabilizing Agent | 0.5-6.0 | 0.3-28.2 |
| Non-Encapsulated biocide: 15% Diuron, 9% BCM, 3% IPBC | 0.1-0.9 | 0.4-5.7 |
| Encapsulated biocide: IPBC | 0.1-1.50 | 0.3-6.6 |
| Total | 100 wt % | 100 wt % |

The polysiloxane-acrylic resin/emulsion (Ceranate Voncoat SA-6360 from the DIC Corporation incorporated by reference herein) is included within the liquid coating(s) and dry coating(s) in the concentrations shown in Table 1. The polysiloxane-urethane resin/emulsion (Ceranate WHW-822 from the DIC Corporation incorporated by reference herein) is included within the liquid coating(s) and dry coating(s) in the concentrations shown in Table 1. The first stabilizing agent, hydroxyphenyltriazine (HPT) (Tinuvin® 400-DW ECO Technical Data Sheet BASF (April 2022) incorporated by reference herein), is included within the liquid coating(s) and dry coating(s) in the concentrations shown in Table 1. The second stabilizing agent, decanedioic acid, bis(2,2,6,6-tetramethyl-1-(octyloxy)-4-piperidinyl) ester (Tinuvin® 123-DW ECO Technical Data Sheet BASF (2019) incorporated by reference herein), is included within the liquid coating(s) and dry coating(s) in the concentrations shown in Table 1. The non-encapsulated biocide (Diuron, BCM, IPBC (Polyphase 663 EPA Registration No. 5383-109; Product Code 10614 Troy Corporation (2016)) incorporated by reference herein) is included within the liquid coating(s) and dry coating(s) in the concentrations shown in Table 1. The encapsulated biocide (IPBC (Polyphase PW20 EPA Registration No. 5383-197 Arxada (2023)) incorporated by reference herein) is included within the liquid coating(s) and dry coating(s) in the concentrations shown in Table 1. Water may be further included in the liquid coating composition in the concentrations disclosed in Table 1.

Table 2 shows a preferred exemplary formulation of the liquid coating composition (i.e., the liquid anti-fungal and/or algae resistant composition as disclosed herein) pre-application to the substrate.

TABLE 2

| Components of Coating Composition | Exemplary Liquid Coating Composition (wt %) |
|---|---|
| Water | 71.45 |
| Polysiloxane-Acrylic Resin/Emulsion | 17.5 |
| Polysiloxane-Urethane Resin/Emulsion | 6.13 |
| Hydroxyphenyltriazine (HPT) | 3.15 |
| Non-Encapsulated biocide: 15% Diuron, 9% BCM, 3% IPBC | 0.81 |
| Encapsulated biocide: IPBC | 0.96 |
| Total | 100 |

In view of the above exemplary compositions and coatings, Applicant further prepared compositions that formed Exemplary Coating 1 and Comparative Example Coating 1 as shown in Table 3 with the objective of further testing gloss retention post-drying/curing on a substrate. With the exception of omitting the encapsulated biocide, Exemplary Coating 1 is substantially identical to the dry coating compositions disclosed in Table 1. It should be further noted that Exemplary Coating 1 includes a total amount of biocide that falls within the total amount of biocide (encapsulated and non-encapsulated) contemplated in the dry coating compositions disclosed in Table 1, and therefore should exhibit similar gloss retention properties as the compositions/coatings disclosed in Table 1 because total biocide concentration that falls within the total amount of biocide (encapsulated and non-encapsulated) contemplated in the dry coating compositions shown in Table 1.

In addition to Exemplary Coating 1, Table 3 further discloses a Comparative Example Coating 1. When compared with Exemplary Coating 1, Comparative Example Coating 1 includes identical concentrations of biocide (i.e., non-encapsulated biocide) and hydroxyphenyltriazine. When further compared with Exemplary Coating 1, Comparative Example Coating 1 differs from Exemplary Coating 1 by including different film forming compositions that form a clear film in its coating. In particular and instead of using a polysiloxane-acrylic resin/emulsion and/or a polysiloxane-urethane resin/emulsion, Comparative Example Coating 1 includes a combination of conventional film forming compositions including an acrylic emulsion (Carboset® AE 960/AE-960E Application Guide from the Lubrizol Corporation (Aug. 18, 2015) incorporated by reference herein) that omits polysiloxane.

TABLE 3

| Components of Coating Composition | Comparative Example Coating 1 | Exemplary Coating 1 |
|---|---|---|
| Polysiloxane-Acrylic Resin/Emulsion (Ceranate Voncoat 6360, 50% Solids | 0 | 74.94% |
| Acrylic Emulsion (Carboset AE 960, 56% Solids) | 92.40% | 0 |
| Polysiloxane-Urethane Resin/Emulsion (Ceranate WHW-822, 35% Solids) | 0 | 17.49% |
| Hydroxyphenyltriazine (HPT) | 5.75% | 5.72% |

TABLE 3-continued

| Components of Coating Composition | Comparative Example Coating 1 | Exemplary Coating 1 |
|---|---|---|
| Water | <1% | <1% |
| Non-Encapsulated biocide: 15% Diuron, 9% BCM, 3% IPBC (Polyphase 663) | 1.85% | 1.85% |
| Total | 100 | 100 |

After forming the coatings disclosed in Table 3 (i.e., Exemplary Coating 1 and Comparative Example Coating 1) on identical substrates, film thickness(es) and hardness(es) were evaluated. Film thickness and hardness of both Exemplary Coating 1 and Comparative Example Coating 1 were substantially similar. Next, both Exemplary Coating 1 and Comparative Example Coating 1 were subjected to ultraviolet (UV) gloss retention by subjecting the coatings to the ASTM G-154 standard (Standard Practice for Operating Fluorescent Light Apparatus for UV Exposure of Nonmetallic Materials ASTM (May 2000) incorporated by reference herein) for 500 hours, 1000 hours, 1500 hours, and 2000 hours. The ASTM G-154 standard utilizes 8 hours of UV exposure (340 nm and 0.89 W/m$^2$) at 60° C. and then 4 hours of condensation (no UV exposure) at 50° C. This process repeats for the designated amount of time (e.g., 500 hours, 1000 hours, 1500 hours, 2000 hours). As shown in Table 4, the baseline for gloss retention at 0 hours was quantified and subsequently normalized as 100%, with any subsequent decrease in percentage after UV exposure representing a decrease in gloss relative to the baseline of 100% at 0 hours and/or with any subsequent increase in percentage after UV exposure representing an increase in gloss relative to the baseline of 100% at 0 hours. Interestingly, a slight increase (3.5%) in gloss was observed at 500 hours for the Exemplary Coating 1. As shown in Table 4, Exemplary Coating 1 retained its gloss throughout each of the time periods while Comparative Example Coating 1 lost gloss throughout each time period and exhibited no gloss retention after 2000 hours. Gloss retention is indicative of both coating durability thus extending the lifetime of the coating's anti-fungal and/or algal resistance properties.

TABLE 4

| Coating Composition | Gloss Retention(60°) | | | | |
|---|---|---|---|---|---|
| | 0 hours | 500 hours | 1000 hours | 1500 hours | 2000 hours |
| Comparative Example Coating 1 | 100% | 44.29% | 16.43% | 11.88% | 0% |
| Exemplary Coating 1 | 100% | 103.5% | 95.5% | 93.42% | 93.83% |

In view of the above exemplary compositions and coatings, Applicant further prepared compositions that formed Exemplary Coating 2 (falling within the compositions disclosed in Table 1) and Comparative Example Coating 2 (Control) as shown in Table 5 with the objective of further testing the anti-fungal efficacy of the coatings. The Comparative Example Coating 2 does not include the non-encapsulated biocide or the encapsulated biocide, whereas the Exemplary Coating 2 includes a combination of both biocides. The Comparative Example Coating 2 and the Exemplary Coating 2 include the second stabilizing agent, decanedioic acid, bis(2,2,6,6-tetramethyl-1-(octyloxy)-4-piperidinyl) ester. The combination of the first and second stabilizing agents provides superior protection against UV radiation. A competitor's composition, which represents a conventional formulation currently used within the industry/field, (Comparative Example Coating 3; representative of CertainTeed GH-704 AR, Master Label (2014), incorporated by reference herein) was also tested. The composition includes 4.4% cuprous oxide (CAS No.: 1317-39-1) as the active ingredient.

TABLE 5

| Components of Coating Composition | Comparative Example Coating 2 | Exemplary Coating 2 |
|---|---|---|
| Polysiloxane-Acrylic Resin/Emulsion (Ceranate Voncoat 6360, 50% Solids | 66% | 62.9% |
| Acrylic Emulsion (Carboset AE 960, 56% Solids) | 0% | 0% |
| Polysiloxane-Urethane Resin/Emulsion (Ceranate WHW-822, 35% Solids) | 28.6% | 25.4% |
| Hydroxyphenyltriazine (HPT) (Tinuvin 400-DW Eco) | 4.1% | 4.1% |
| Decanedioic Acid, Ester (Tinuvin 123-DW Eco) | 1.3% | 1.3% |
| Non-Encapsulated biocide: 15% Diuron, 9% BCM, 3% IPBC (Polyphase 663) | 0% | 2.4% |
| Encapsulated biocide: IPBC (Polyphase PW20 EPA) | 0% | 3.9% |
| Total | 100% | 100% |

After forming the coatings disclosed in Table 5 (i.e., Exemplary Coating 2 and Comparative Example Coating 2), the anti-fungal efficacy of the coatings was tested. The Exemplary Coating 2 and Comparative Example Coating 3 were applied to aluminum substrates and subsequently sized into test pieces (1.5 in×1.5 in). Comparative Example Coating 3 was pre-applied on a roof shingle and was similarly sized into test pieces (1.5 in×1.5 in). The anti-fungal efficacy studies were undertaken with the green algae, *Auxenochlorella protothecoides* (ATCC #30581), and followed the modified version of the ASTM E2180 parameters (as discussed below). The green algae was rehydrated, cultured onto media (i.e., Potato Dextrose Agar (PDA)), and allowed to grow for 7 to 14 days at 23° C.±2° C. and 75% relative humidity with 12 hours of alternating light and dark cycles of fluorescent lighting. The incubation was performed in Sunblaster Nanodomes. After achieving a lawn of growth, the green algae was collected using a swab, mixed into a saline media, and thoroughly vortexed. This solution is diluted into a final concentration of agar slurry with a non-ionic wetting agent at a final concentration of 0.05% (v/v) to produce the inoculum. A 0.5 mL aliquot of inoculum was pipetted onto the test sample (i.e., aluminum coupons and roof shingles). A piece of sterile polyethylene film (1 in×1 in) was placed onto the inoculum. The polyethylene film ensures there is contact with the coating and prevents desiccation. The samples were incubated for 96 hours at 23° C.±2° C. and 75% relative humidity with 12 hours of alternating light and dark cycles of fluorescent lighting. After incubation, the samples were recovered in 100 mL of Letheen Broth to neutralize the active ingredient (i.e., the biocides and/or cuprous oxide). The samples were enumerated on PDA by incubating the enumeration plates for 10 days at 23° C.±2° C. and 75% relative humidity with 12 hours of alternating light and dark cycles of fluorescent lighting.

The inoculum had an average log of 6.12. As shown in Table 6, Exemplary Coating 2 exhibited a superior average log (i.e., 2.00) compared to the Comparative Example Coatings (i.e., greater than 6.00). Furthermore, when comparing the log reduction to the Control (i.e., Comparative Example Coating 2), the Exemplary Coating 2 composition exhibited a log reduction of greater than 4.27, thus the population of algae was reduced by over 99.99%. Conversely, when comparing the log reduction to the Control (i.e., Comparative Example Coating 2), the Comparative Example Coating 3 exhibited a log reduction of 0.01. Thus, the Exemplary Coating 2 composition provided better anti-fungal efficacy against the green algae compared to the Comparative Coatings. The log reduction data was further analyzed using an unpaired two-tailed student t-test with a significance level of $\alpha$=0.05 and an equivalency margin of $\delta$=0.5 and followed the parameters set forth in ASTM E1054. When comparing the Exemplary Coating 2 with the Comparative Example Coating 2 (Control), a P value of less than 0.0001, which was found to be statistically significant. When comparing the Comparative Example Coating 3 with the Comparative Example Coating 2 (Control), a P value of 0.9541 was obtained, which was found to not be statistically significant. Thus, the Exemplary Coating 2 exhibits an increased anti-fungal efficacy when compared to the Comparative Example Coating 3.

TABLE 6

| Coating Composition | Average Log | Log Reduction vs. Control |
|---|---|---|
| Comparative Example Coating 2 (Control) | 6.27 | N/A |
| Comparative Example Coating 3 | 6.26 | 0.01 |
| Exemplary Coating 2 | 2.00 | >4.27 |

The combination of non-encapsulated biocide and encapsulated biocide exhibits increased durability when compared with the sole use of either biocide. Moreover, the combination of biocides exhibits decreased substrate yellowing which produces a more aesthetically pleasing appearance. Roughly the same anti-fungal efficacy is observed (log reduction around 3) when the non-encapsulated biocide is omitted. However, lower anti-fungal efficacy (reduced log reduction) is observed when the encapsulated biocide is omitted. The encapsulated biocide provides a time-release feature which yields longer lasting anti-fungal efficacy.

Figure 3:
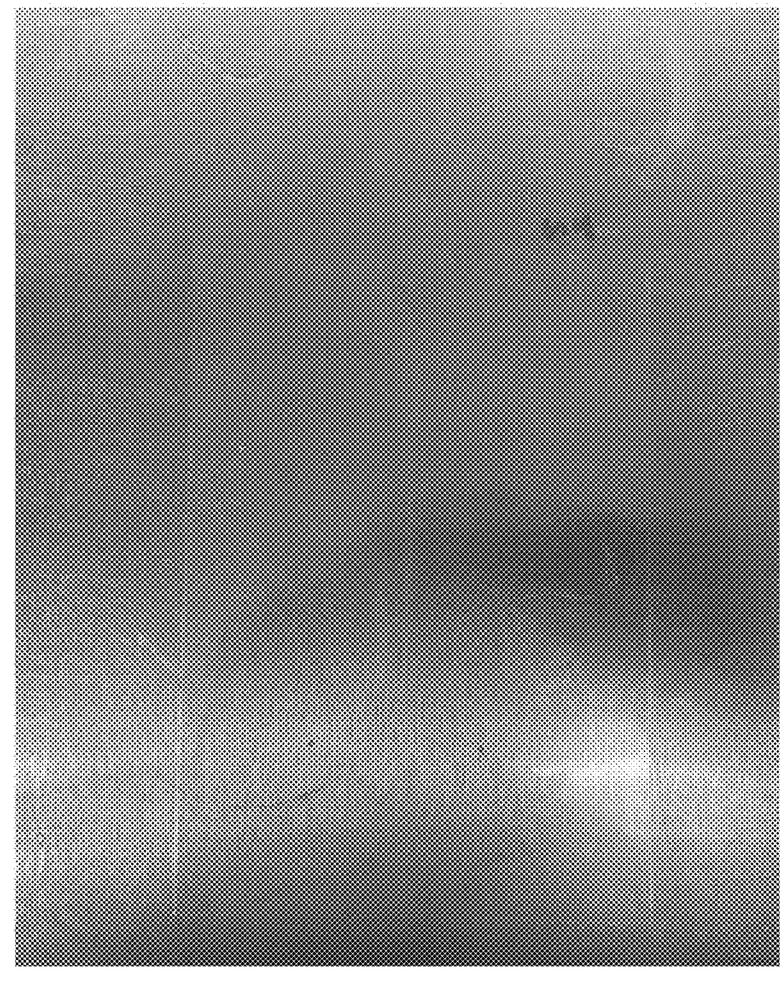
FIG. 3 is a photograph displaying the film formation on a polyester substrate after treatment with Exemplary Coating 3.

In view of the above exemplary compositions and coatings, Applicant further prepared a composition that formed Comparative Example Coating 4 and Comparative Example Coating 5 (Control) as shown in Table 7 with the objective of further testing the appearance of the coating when cuprous oxide is included and/or excluded. The coatings were applied to a clear polyester film. In addition to the poor efficacy observed with cuprous oxide, the use of cuprous oxide as a clear film in a coating is not feasible due to the extreme color change observed. FIG. 1 shows the extreme color change observed when the polyester film was treated with Comparative Example Coating 4. The coating became gold in appearance and lost the clear/translucent properties. The Comparative Example Coating 5 (Control), which does not contain a biocide (e.g., cuprous oxide), did not change color and remained clear/translucent. Moreover, FIG. 3 which contains the non-encapsulated biocide, did not change color and remained clear/translucent. Thus, the color change was due to the presence of cuprous oxide. Cuprous oxide does not provide a clear/translucent coating.

TABLE 7

| Components of Coating Composition | Comparative Example Coating 4 | Comparative Example Coating 5 (Control) | Exemplary Coating 3 |
|---|---|---|---|
| Polysiloxane-Acrylic Resin/Emulsion (Ceranate Voncoat 6360, 50% Solids | 69% | 69% | 63.5% |
| Polysiloxane-Urethane Resin/Emulsion (Ceranate WHW-822, 35% Solids) | 23% | 23% | 25% |
| Hydroxyphenyltriazine (HPT) (Tinuvin 400-DW Eco) | 3.7% | 3.7% | 4% |
| Decanedioic Acid, Ester (Tinuvin 123-DW Eco) | 1.2% | 1.2% | 1.3% |
| Non-Encapsulated biocide: 15% Diuron, 9% BCM, 3% IPBC (Polyphase 663) | 0% | 0% | 2.4% |
| Encapsulated biocide: IPBC (Polyphase PW20 EPA) | 0% | 0% | 3.8% |
| Cuprous Oxide | 3.1% | 0% | 0% |
| Total | 100% | 100% | 100% |

The use of metals, such as copper oxide, is toxic to humans and the environment. Copper oxide is toxic to aquatic organisms and can cause long-term effects in an aquatic environment. These toxicity concerns can be avoided when replacing metals with the organic biocides found in Polyphase 663 and/or Polyphase PW20CR. Furthermore, these biocides provide a clear film with improved anti-fungal and/or anti-algal efficacy.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A liquid anti-fungal and/or algae resistant composition that forms a clear coating on a substrate post-application comprising:

(a) water at a concentration of up to 70 wt % of the composition;

(b) a biocide dispersed within the water present in an effective amount to prevent and/or reduce fungal and/or algal growth on the substrate post-application;

(c) a stabilizing agent dispersed within the water; and (d) a film forming composition dispersed within the water present in an effective amount to form a clear film on the substrate post-application;

wherein the biocide comprises encapsulated and non-encapsulated biocides; and wherein the liquid anti-fungal and/or algae resistant composition includes the unencapsulated biocide and the encapsulated biocide at a ratio ranging from 3:1 to 1:7 relative to one another.

2. The liquid anti-fungal and/or algae resistant composition of claim 1, wherein the composition includes less than 0.01 wt % heavy metal containing components and less than 0.01 wt % fluoro containing components.

3. The liquid anti-fungal and/or algae resistant composition of claim 1, wherein the film forming composition is an organic, inorganic hybrid resin.

4. The liquid anti-fungal and/or algae resistant composition of claim 3, wherein an organic, inorganic hybrid film forming composition comprises 10 wt % to 45 wt %.

5. The liquid anti-fungal and/or algae resistant composition of claim 1, wherein the film forming composition comprises a siloxane component and organic component.

6. The liquid anti-fungal and/or algae resistant composition of claim 1, wherein the film forming composition comprises a polysiloxane-acrylic resin and polysiloxane-urethane resin.

7. The liquid anti-fungal and/or algae resistant composition of claim 6, wherein the polysiloxane-acrylic resin comprises a shell-core configuration in which the polysiloxane is encapsulated by the acrylic.

8. The liquid anti-fungal and/or algae resistant composition of claim 1 wherein the encapsulated biocide is configured to release the biocide from the coating on a substrate post-application for 6 months to 5 years.

9. The liquid anti-fungal and/or algae resistant composition of claim 8, wherein the encapsulated biocide comprises 0.1 wt % to 2 wt % of the composition.

10. The liquid anti-fungal and/or algae resistant composition of claim 8, wherein the non-encapsulated biocide comprises 0.1 wt % to 1 wt % of the composition.

11. The liquid anti-fungal and/or algae resistant composition of claim 8, wherein the encapsulated and non-encapsulated biocide comprise at least a carbamate having biocidal activity.

12. The liquid anti-fungal and/or algae resistant composition of claim 8, wherein the encapsulated and non-encapsulated biocide comprise at least a butylcarbamate having biocidal activity.

13. The liquid anti-fungal and/or algae resistant composition of claim 12, wherein the non-encapsulated biocide further comprises an aromatic biocide.

14. The liquid anti-fungal and/or algae resistant composition of claim 13, wherein the aromatic biocide comprises an aromatic urea compound and an aromatic carbamate.

15. The liquid anti-fungal and/or algae resistant composition of claim 14, wherein the aromatic biocide comprises 3-(3,4-dichlorophenyl)-1,1-dimethylurea, methyl 1H-benzimidazol-2-ylcarbamate, or any combination thereof.

16. The liquid anti-fungal and/or algae resistant composition of claim 1, wherein the stabilizing agent comprises 0.5 wt % to 6 wt % of the composition.

17. The liquid anti-fungal and/or algae resistant composition of claim 1, wherein the stabilizing agent comprises an ultraviolet (UV) stabilizing agent.

18. The liquid anti-fungal and/or algae resistant composition of claim 17, wherein the UV stabilizing agent comprises a first UV stabilizing agent, a second UV stabilizing agent, or a combination thereof.

19. The liquid anti-fungal and/or algae resistant composition of claim 18, wherein the first UV stabilizing agent is a heterocycle.

20. The liquid anti-fungal and/or algae resistant composition of claim 19, wherein the first UV stabilizing agent is a triazine compound.

21. The liquid anti-fungal and/or algae resistant composition of claim 18, wherein the first UV stabilizing agent comprises 2-[4-[(2-Hydroxy-3-dodecyloxypropyl)oxy]-2-hydroxyphenyl]-4,6-bis(2,4-dimethylphenyl)-1,3,5-triazine, 2-[4-[(2-Hydroxy-3-tridecyloxypropyl)oxy]-2-hydroxyphenyl]-4,6-bis(2,4-dimethylphenyl)-1,3,5-triazine, or any combination thereof.

22. The liquid anti-fungal and/or algae resistant composition of claim 18, wherein the second UV stabilizing agent comprises an ultraviolet (UV) stabilizing agent that includes a hindered amine and/or heterocyclic.

23. The liquid anti-fungal and/or algae resistant composition of claim 22, wherein the second UV stabilizing agent comprises hindered amine light stabilizers (HALS).

24. The liquid anti-fungal and/or algae resistant composition of claim 22, wherein the second UV stabilizing agent comprises a derivative of tetramethylpiperidine.

25. The liquid anti-fungal and/or algae resistant composition of claim 18, wherein the first and second UV stabilizing agents are present at a ratio ranging from 1:1 to 5:1 relative to one another.

26. The liquid anti-fungal and/or algae resistant composition of claim 25, wherein the liquid anti-fungal and/or algae resistant composition includes the biocide and film forming composition at a ratio ranging from 1:3 to 1:60 relative to one another.

27. The liquid anti-fungal and/or algae resistant composition of claim 26, wherein the liquid anti-fungal and/or algae resistant composition includes the polysiloxane-acrylic resin and polysiloxane-urethane resin at a ratio ranging from 9:1 to 1.1:1 relative to one another.

28. The liquid anti-fungal and/or algae resistant composition of claim 27, wherein the liquid anti-fungal and/or algae resistant composition includes the biocide and the stabilizing agent at a ratio ranging from 8:1 to 1:4 relative to one another.

29. A method of coating a substrate comprising:

(a) applying the composition of claim 1 to a substrate; and (b) after step (a), drying and/or curing the composition to the substrate thereby forming the coated substrate, wherein the substrate is porous or non-porous material and/or the substrate is a non-functionalized substrate, an electrostatically neutral substrate, or a combination thereof.

* * * * *